(12) United States Patent
Johnston et al.

(10) Patent No.: US 6,870,631 B2
(45) Date of Patent: Mar. 22, 2005

(54) PROFILING OF A COMPONENT HAVING REDUCED SENSITIVITY TO ANOMALOUS OFF-AXIS REFLECTIONS

(75) Inventors: Kyle S. Johnston, Bothell, WA (US); Tomas E. Lock, Issaquah, WA (US); Thomas R. Clary, Issaquah, WA (US); Spencer G. Nelson, Bothell, WA (US); Heath M. Greenberg, Seattle, WA (US)

(73) Assignees: Metron Systems, Inc., Snoqualmie, WA (US); The Boeing Company, Seattle, WA (US)

( * ) Notice: Subject to any disclaimer, the term of this patent is extended or adjusted under 35 U.S.C. 154(b) by 0 days.

(21) Appl. No.: 10/183,696

(22) Filed: Jun. 27, 2002

(65) Prior Publication Data

US 2002/0180988 A1 Dec. 5, 2002

Related U.S. Application Data

(62) Division of application No. 09/631,378, filed on Aug. 3, 2000, now Pat. No. 6,441,908.
(60) Provisional application No. 60/147,566, filed on Aug. 6, 1999.

(51) Int. Cl.[7] .............................................. G01B 11/24
(52) U.S. Cl. ........................ 356/602; 356/623; 250/236
(58) Field of Search ................................ 356/601, 602, 356/606–608, 614, 622, 623, 4.07, 624; 250/234–236, 559.22, 559.24, 559.29; 359/212–218, 204, 206

(56) References Cited

U.S. PATENT DOCUMENTS

| 4,277,141 A | | 7/1981 | Kleiber |
| 4,498,778 A | | 2/1985 | White |
| 4,567,347 A | * | 1/1986 | Ito et al. ................. 219/124.34 |

(List continued on next page.)

FOREIGN PATENT DOCUMENTS

| EP | 0 377 973 | 7/1990 |
| EP | 0 618 472 | 10/1994 |
| JP | 03 198650 | 8/1991 |

OTHER PUBLICATIONS

A Real–time Optical Profile Sensor For Robot Arc Welding, Oomen et al, Proceedings Of The SPIE, vol. 449, Intelligent Robots: RoViSeC3, 1983 pp. 62–71.

(List continued on next page.)

*Primary Examiner*—Hoa Q. Pham
(74) *Attorney, Agent, or Firm*—Reed Smith LLP; William J. McNichol, Jr.; Matthew J. Esserman

(57) ABSTRACT

A system and method for measuring the profile of an external surface of a part is provided. The system includes a source of light that directs light onto a region of the external surface of the part. The system also includes a linear, light-sensitive sensor, and a lens used to image locations within the region onto the sensor. The source of light and the sensor are located substantially within the same plane such that the sensor detects substantially only light scattered, diffracted, or reflected from the region and travelling substantially within the plane. The system additionally includes a re-positionable mirror that re-directs the light emitted from the source of light to the plurality of locations within the region and re-directs light scattered, diffracted, or reflected from the plurality of locations within the region to the lens and the sensor. An automatic gain control system which controls the output power of the source of light to thereby avoid saturating the exposure of the sensor may also be included in the above system. Further, a spring which functions as a low-pass filter may be used to couple the motor to the shaft of the rotating mirror. In another embodiment, a re-positionable polygon mirror system comprising standoffs with tangs which restrict the outside reflecting mirror surfaces to pre-aligned planes during rotation of the polygon mirror system is disclosed. A fail-safe eye safety technique is also disclosed which controls the power to the source of light. Even further, an optical scanning system is disclosed which utilizes bi-cell photodetectors to determine the angular position of the source of light with high precision.

1 Claim, 13 Drawing Sheets

U.S. PATENT DOCUMENTS

| | | | |
|---|---|---|---|
| 4,628,469 A | | 12/1986 | White |
| 4,639,140 A | * | 1/1987 | Lerat .......................... 356/609 |
| 4,759,593 A | | 7/1988 | Kessler |
| 4,761,072 A | * | 8/1988 | Pryor ........................ 356/3.08 |
| 4,863,268 A | * | 9/1989 | Clarke et al. ............ 356/237.2 |
| 4,880,299 A | | 11/1989 | Hamada |
| 4,932,784 A | * | 6/1990 | Danneskiold-Samsoe ... 356/602 |
| 4,943,157 A | * | 7/1990 | Reding ...................... 356/3.06 |
| 4,979,816 A | | 12/1990 | White |
| 5,004,929 A | | 4/1991 | Kakinoki et al. |
| 5,149,963 A | | 9/1992 | Hassler, Jr. |
| 5,151,608 A | * | 9/1992 | Torii et al. ............. 250/559.38 |
| 5,157,486 A | | 10/1992 | Baird et al. |
| 5,171,984 A | | 12/1992 | van Rosmalen |
| 5,177,556 A | * | 1/1993 | Rioux .......................... 356/73 |
| 5,245,182 A | | 9/1993 | Van Rosmalen et al. |
| 5,450,219 A | | 9/1995 | Gold et al. |
| 5,489,985 A | | 2/1996 | Mochida et al. |
| 5,550,668 A | | 8/1996 | Appel et al. |
| 5,617,133 A | | 4/1997 | Fisli |
| 5,739,912 A | * | 4/1998 | Ishii .......................... 356/602 |
| 5,754,215 A | | 5/1998 | Kataoka et al. |
| 5,777,311 A | | 7/1998 | Keinath et al. |
| 5,789,743 A | | 8/1998 | Van Rosmalen |
| 5,828,479 A | | 10/1998 | Takano et al. |
| 5,850,289 A | * | 12/1998 | Fowler et al. .............. 356/603 |
| 5,864,394 A | | 1/1999 | Jordan, III et al. |
| 5,880,846 A | * | 3/1999 | Hasman et al. ............. 356/602 |
| 6,046,801 A | | 4/2000 | Liu et al. |
| 6,151,564 A | | 11/2000 | Vescovi et al. |
| 6,205,406 B1 | | 3/2001 | Hahn et al. |

OTHER PUBLICATIONS

Science Applications International Corporation, "Recent Applications Of Laser Line Scan Technology And Data Processing", SAIC Science and Technology Trends, 1998, pp., 190–195.

"Motor/Polygon Speed Stability Definition And Measurement", Lincoln Laser Scanning Systems, 1993, Appl. Note #214, pp., 1–4.

* cited by examiner

PROFILING OF A COMPONENT HAVING REDUCED SENSITIVITY TO ANOMALOUS OFF-AXIS REFLECTIONS This is a divisional application of U.S. application Ser. No. 09/631,378, filed Aug. 3, 2000 now U.S. Pat. No. 6,441,908, which claims priority from U.S. Provisional Application Ser. No. 60/147,566, filed Aug. 6, 1999.

FIELD OF THE INVENTION

The present invention relates generally to the field of scanning devices. In particular, the present invention relates to the profiling of a component which includes scanning a spot of light through a range of angles. More specifically, the present invention relates to the measuring of the external surface profile of a component using a non-contact optical technique which has reduced sensitivity to anomalous off-axis reflections. Even more specifically, the present invention relates to the measuring of the external surface profile of a component using a non-contact optical technique which scans the field of view by utilizing a rotating mirror and which precisely determines the pointing angles using a time-based method.

BACKGROUND OF THE INVENTION

Freshly machined metallic (e.g. aluminum) parts, or components, have a highly reflective surface finish such that they can be considered a mirror with random grating marks. Conducting optical metrology on reflective surfaces of this type is difficult because the secondary reflections show up as bright anomalies that can severely complicate analysis. Although the initial measuring spot is visible, the anomalous light caused by scattering, diffraction, reflections, and multiple reflections off the part surface other than from the desired scan region show up as much brighter when recorded by a detector (or camera).

An existing form of non-contact profile measurement system that is currently commercially available includes the use of a laser fan that illuminates the part to be tested and a two-dimensional area detector that measures the profile of the part. This type of system uses no moving parts, includes the ability to operate with background ambient light, and results in cross-section measurement by simultaneously analyzing the entire area illuminated by the laser fan. The system has disadvantages associated with it that are significant, for example, the number of rows and columns in the area detector fundamentally limits depth resolution and cross-section resolution, respectively, of the system. Complicated tradeoffs in imaging performance occur because the area detector is rectangular in extent while the field of view of the area detector and the laser fan are both roughly trapezoidal in shape. This results in the area detector having a practical readout speed limitation of less than 60 frames per second which limits how fast this system can scan parts. The most significant drawback of this scanning technique is the system's sensitivity to spurious reflections from highly reflective parts because, as explained above, the image of spurious reflections of the laser fan can be brighter than the initial image where the-fan illuminates the portion of the part. Such detection of the spurious reflections resulting from the laser striking highly reflective machined surfaces confuses the image processing of this type of scanning system and, therefore, renders the system completely ineffective at measuring highly reflective machined surfaces.

Another existing non-contact profile measurement system that utilizes a laser having a potential for less sensitivity to spurious reflections is a system comprising a single point of illumination light that is scanned across the part and measured using a "staring" area detector having a fixed field of view. Such a system, however, is not immune to detecting spurious reflections and can be easily confused when the image of the spurious light is brighter than the image of the initial laser spot. This system also has limitations to its depth resolution and cross-section resolution dependent on the characteristics of the area detector utilized. The most significant drawback to this particular approach is that it is extremely slow since it can measure only one point per frame of the area detector. This results in the area detector having a practical readout speed limitation of less than 60 points per second.

Even still another existing non-contact profile measurement system that utilizes a laser is a height gauge system which uses a single point laser illumination and a linear detector. There are several inexpensive and relatively fast single point laser scanners based on this technique that are commercially available for applications such as web inspections. Although this type of system has low sensitivity to off-axis spurious reflections due to the linear detector having a limited field of view, the main drawback to this technique is that the system only measures the height of the test part in one location and has no provision to provide a cross-sectional profile scan of the entire external surface of the part. It is possible to move the part under the single point scan or to move the system completely around the external profile of the part. This would be the optical equivalent of the single point touch probes used in coordinate measuring machines (CMMs). Although this technique can be accurate, it is also very slow. Since an excessive amount of time would be required to measure the external surface profile of the part with sufficient density, this technique is normally utilized to measure only a few representative points along the external surface of the part.

Polygon mirrors are well known in the art of applications such as printing and bar-code scanning. These polygon mirror scanners involve a metal disk with highly polished facets around the perimeter. In such implementations, the metal disk acts as both the structure of the rotor and the substrate of the mirror. This monolithic approach can yield a stable structure with very repeatable scan characteristics. One drawback to this method is that the surfaces of the mirrors are prone to defects left over from the machining process. If a post-machining polishing step is used to minimize the mirror defects, other undesirable defects such as edge turndown and wavy surfaces are likely to result. These common defects can result in unwanted scattering and out-of-plane wandering of the reflected light. As a result, high quality monolithic polygon mirror construction is time consuming and is therefore an expensive process that would be extremely prohibitive for the size of the rotor required in this system.

Another typical method for constructing these types of polygon mirror scanners involve adhering individual mirrors (typically first surface glass mirrors) to a supporting rotor structure. This is an inexpensive method of insuring good quality mirror surfaces that can be applied to rotors with large facets. The potential drawback to this technique is that it can be difficult to adhere the mirrors to the substrate in a fashion that insures common alignment of all the facets so as to minimize out-of-plane variation of the reflected light. Additionally, the mechanical stability and alignment can be adversely affected in the presence of effects such as temperature variations.

The most common motors used to drive precision scanner rotors are either AC brushless or DC brushless motors.

Brushless motors are utilized primarily because they have minimized rotational "cogging" which is present to a small degree with all brushed motors and to a very large extent with stepper motors. At high rotational speeds, brushless motors can be controlled to yield extremely constant rotational velocities. However, these precision controllers are relatively expensive to implement.

A barrier to utilizing either brushless or brushed motors in this scanning system is that it is difficult to establish precise rotational control when the rotational velocities are as slow as 60 RPM. The torque delivered by such motors during rotation is centered on a few poles determined by the structure of the motors. To help even out the uneven application of torque, angular momentum (L) is typically utilized to smooth out the effects of the uneven forces applied during rotation. The angular momentum is related to the structure and motion of the rotor by $L=I\omega$ where I is the moment of inertia of the rotor and $\omega$ is the angular velocity. At high angular velocities, the rotor stores a lot of angular momentum and only small amounts of torque per impulse are needed, resulting in minimum perturbation of the velocity. With slow rotation, the rotor does not store much angular momentum, higher torque impulses are needed, and effective control becomes difficult. Additionally, stepper-type motors have been utilized in existing scanning systems. Although a stepper motor is relatively low in cost and is inexpensive to control, this type of motor subjects the rotor that is directly coupled thereto to high frequency impulses from the stepping of the motor. These unwanted high frequency impulses cause significant vibrations which adversely affect the effective control of the rotational velocity of the rotor.

A key part of establishing control of the rotational velocity of a rotor is a method of monitoring either its angular velocity or angular position. Knowledge of angular position is also extremely important in a polar coordinate dimensional scanning application in order to determine exactly what the pointing angle of the measurement beam is when the measurement is taken. One typical method of angular position determination is to use a quadrature signal off a pair of ancillary motor windings to indicate the position of the motor shaft. However, this method cannot practically achieve the 5 $\mu$radians resolution needed by this system. Another typical method involves the use of an optical or magnet readout angular encoder affixed to the shaft of either the motor or the rotor. Although angular encoders with sufficient resolution can be obtained, they are extremely cost prohibitive. Further, a shaft encoder only provides indirect information about the actual location of the scan beam. If a mirror facet is not situated perfectly tangential to the rotor radius, e.g. if the mirror facet is twisted, then there would be an angular mismatch between the measurement beam and the reading from the shaft encoder.

An existing method of monitoring the angular velocity of the rotor that is coupled to the actual scanning beam is a timing method based on a start-of-scan (SOS) pulse and an optional end-of-scan (EOS) pulse. Such a method usually utilizes a high-speed clock that is reset when the beam sweeps across the SOS detector. Angular velocity control of the rotor can be achieved by monitoring either the time between successive SOS pulses or, more effectively, the elapsed time between SOS and EOS pulses. As shown in FIG. 11, one common implementation of a SOS detector is a knife-edge aperture with an optical detector 310 situated behind it. The measurement beam sweeps across the aperture and onto the detector, providing a sharp edge in the detected photo-signal to trigger the start of the clock. The potential drawback to this implementation is that the rising edge of the photo-signal has a slope that is related to the width of the laser beam, the scan speed of the beam sweep and the intensity of the measurement beam. The leading edge of the beam clearing the aperture will cause the onset of a rising photo-signal (point A—curve 1) which will continue to rise until the lagging edge of the beam clears the aperture (point B—curve 1). When the photo-signal crosses a fixed trigger level, the clock will start at position $\theta_1$. However, for the same beam width and sweep rate, a beam of lesser intensity (shown as dashed curve 2) will trigger the clock at a later position $\theta_2$. This variation will cause jitter in the angular reference and degrade the precision of the entire scanning system.

A still further problem with existing non-contact measurement systems that utilize a laser involves eye safety concerns. In order to comply with eye safety requirements, the system needs to incorporate a fail-safe technique for avoiding eye damage caused by the measurement laser when the rotation rate of the rotor falls below a critical threshold. A fail-safe approach must be implemented that prevents the measurement laser beam from direct viewing until the rotor has reached a safe rotational speed and turns it off or blocks it in the event that the rotor stalls or slows below the safe rotational speed. Although a physical shutter mechanism could fill this requirement, it is not easily designed to be fail-safe.

It is therefore an object of the present invention to provide a system which has reduced sensitivity to spurious reflections of highly reflective parts when measuring the profile of an external surface of a component.

It is another object of the present invention to provide a system which has high depth and cross-sectional resolution output capability when measuring the profile of an external surface of a component.

It is a further object of the present invention to provide a system which is capable of high-speed measurement of the entire cross-sectional profile of the external surface of the component when measuring the profile of an external surface of a component.

It is a further object of the present invention to provide a system which has a large depth of field and a large cross-sectional field of view when measuring the profile of an external surface of a component.

It is a further object of the present invention to provide a system that is used for measuring the profile of an external surface of a component and which includes an automatic gain control system which controls the output power of a source of light to thereby avoid saturating the exposure of the sensor.

It is a further object of the present invention to provide a system which is capable of attenuating or eliminating undesired high frequency vibrations associated with the use of, for example, a stepper motor, when measuring the profile of an external surface of a component.

It is a further object of the present invention to provide a system that is used for measuring the profile of an external surface of a component and which includes a rotor structure design having precisely aligned outside reflecting surfaces of mirrors during rotation.

It is a further object of the present invention to provide a system that is used for measuring the profile of an external surface of a component and which monitors and controls the angular velocity or angular position of the rotor in order to control with high precision the rotational velocity of the rotor. Such a system would not suffer from temporal or positional jitter due to variations in the intensity of the measurement beam, variations in laser beam width, and variations in the scan speed of the beam sweep.

It is a still further object of the present invention to provide a system that is used for measuring the profile of an external surface of a component and which includes a fail-safe technique that avoids the potential for eye damage caused by the laser measurement beam.

These and other objects and advantages of the invention will become more fully apparent from the description and claims which follow or may be learned by the practice of the invention.

SUMMARY OF THE INVENTION

The present invention is directed to the non-contact measurement of the profile of the external surface of a component to be profiled or tested. The present invention provides a more accurate scan of the component's external surface by significantly reducing the sensitivity of the system to the detection of spurious light resulting from scattered, diffracted, reflected, and/or multiply-reflected light reflecting off the surface of the component to be profiled other than from the desired scan region. The present invention also provides a faster scan of the component's external surface. Thus, the deleterious affects associated with the existing profile measurement systems mentioned above are avoided. The present invention accomplishes these goals by providing a source of light (e.g. a laser) that directs light onto a region of the external surface of the component. A linear, light-sensitive array sensor and a lens which is used to image the region onto the sensor are also provided. The source of light and the sensor are positioned substantially within a common plane such that the sensor substantially detects only light that is scattered, diffracted, or reflected from the region and traveling substantially within the common plane. The present invention preferably includes a re-positionable (e.g. rotatable) mirror positioned between the region and the source of light, the lens, and the sensor. The re-positionable mirror re-directs the light emitted from the source of light to a plurality of locations within the region and re-directs light scattered, diffracted, or reflected from the plurality of locations within the region to the lens and the sensor. The system may also include an automatic gain control (AGC) system which controls the output power of the source of light to thereby avoid saturating the exposure of the sensor.

The present invention is also directed to the scanning of a field of view by a non-contact optical profile measuring system comprising a rotating polygon mirror system including a plurality of mirror facets. A motor of, for example, stepper type with 200 steps per revolution is coupled to a rotor through a torsional spring. The torsion spring acts as a mechanical low pass filter that isolates the rotor shaft from adverse vibrations from the motor impulses thereby enabling stable and precise rotation. The mirror system may comprise standoffs with tangs which restrict the outside reflecting mirror surfaces of the mirror facets to pre-aligned planes during rotation of the mirror system. The reflection of light directed at one end of the rotor is scanned through approximately 120° by the passing of each mirror facet. Small stationary turning mirrors are used to sample the outgoing scan beam near the beginning and the end of the sweep. The sampled light is therefore re-directed to sweep across the set of SOS and EOS positional triggers oriented to allow a 60° scan between them. Each individual trigger mechanism is comprised of an adjacent pair of photo detectors that are combined with a circuit that generates a trigger pulse at the instant when the light is centered over the dividing line between the adjacent photo-detectors. Another circuit measures the elapsed time between the first trigger and the second trigger using a high-speed clock in order to determine the rotational velocity of the rotor. The velocity information for SOS, EOS and between SOS and EOS is used as feedback to a circuit that controls the rotational velocity of the rotor. The SOS is also used to trigger the beginning of exposures by the optical profiling system where each exposure receives a time stamp from the high-speed clock. The time stamp of each exposure is combined with the initial and final rotational velocity of the rotor to compensate for velocity variations and determine the rotational position to an accuracy of better than 5 $\mu$radians (micro-radians). A series of reflective photo-sensors form an optical encoder by detecting the passing of the mirror facets. The reflective photo-sensors are oriented at different angles so they generate a constant series of pulses as the rotor turns. These pulses are used by the velocity control circuit to establish a rough rotation rate and by the fail-safe eye safety circuit to turn the laser off or dim the laser if the rotation rate of the rotor falls below a predetermined threshold, e.g. 1 Hz.

BRIEF DESCRIPTION OF THE DRAWINGS

In order that the manner in which the above-recited and other advantages and objects of the invention are obtained can be appreciated, a more particular description of the invention briefly described above will be rendered by reference to a specific embodiment thereof which is illustrated in the appended drawings. Understanding that these drawings depict only a typical embodiment of the invention and are not therefore to be considered limiting of its scope, the invention and the presently understood best mode thereof will be described and explained with additional specificity and detail through the use of the accompanying drawings.

DETAILED DESCRIPTION OF THE PREFERRED EMBODIMENT

Figure 1:
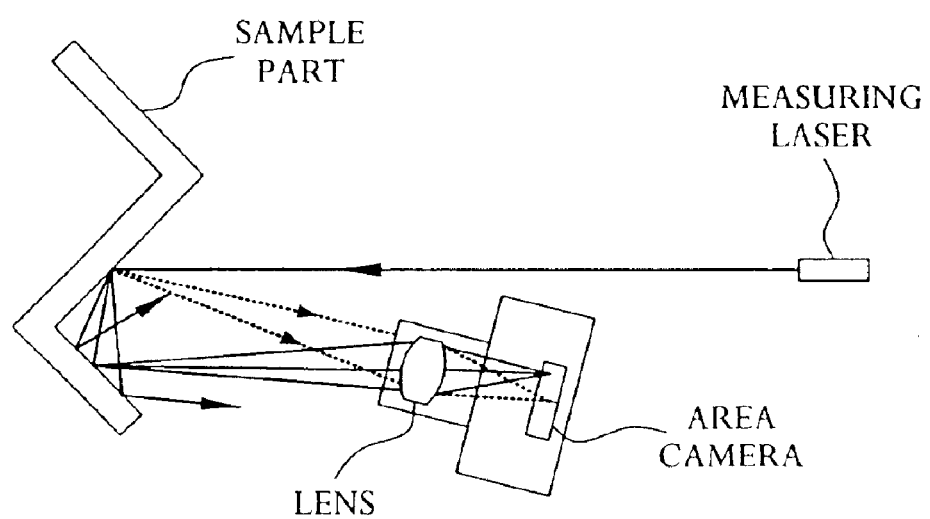
FIG. 1 is a side view of a prior art non-contact profile measurement system that utilizes an area detector and a laser that illuminates a highly-reflective part resulting in substantial detection of spurious reflections.

Reference will now be made to the drawings wherein like structures are provided with like reference designations. It will be understood that the drawings included herewith only provide diagrammatic representations of the presently preferred structures of the present invention and that structures falling within the scope of the present invention may include structures different than those shown in the drawings.

Figure 2:
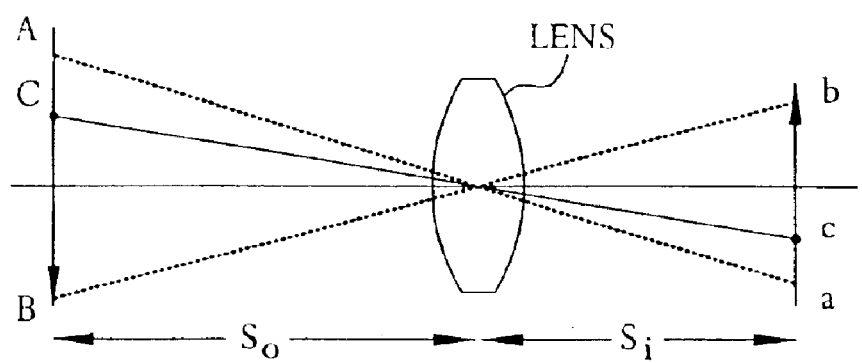
FIG. 2 is a simplified illustration showing the function of a lens from a non-contact profile measurement system, in accordance with a preferred embodiment of the present invention.

The method of non-contact optical scanning used in the present invention utilizes optical triangulation to measure the location in space where a laser beam intersects the surface of the part being measured. Optical triangulation is shown in FIG. 2 where an object on the left side of the lens is labeled with three points, "A", "B" and "C". The object forms an image on the right side of the lens, with points labeled as "a", "b" and "c", respectively. The image can be analyzed to determine the spatial relationship of C to A and B on the object side of the lens. Analysis requires finding the relative relationship of c to a and b in the image plane and solving for similar triangles based on the lens to image distance ($s_i$) and the lens to object distance ($s_o$).

It is not necessary for the object and image to be oriented perpendicular to the optical axis of the lens. A tilted object will produce a tilted image where it is still possible to utilize similar triangles to determine object space locations based on analysis of image space locations. To a first order of approximation, the object plane and the plane of the image will satisfy the Scheimpflug condition and intersect at the plane of the lens.

Figure 3:
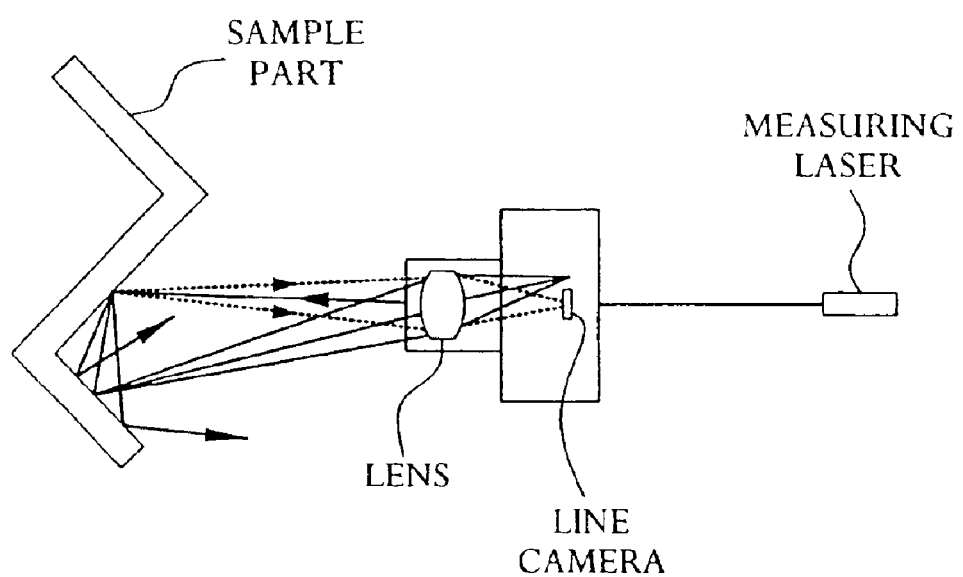
FIG. 3 is a side view of a non-contact profile measurement system that utilizes a laser which illuminates a highly reflective part resulting in reduced detection of spurious reflections, in accordance with a preferred embodiment of the present invention.
Figure 4:
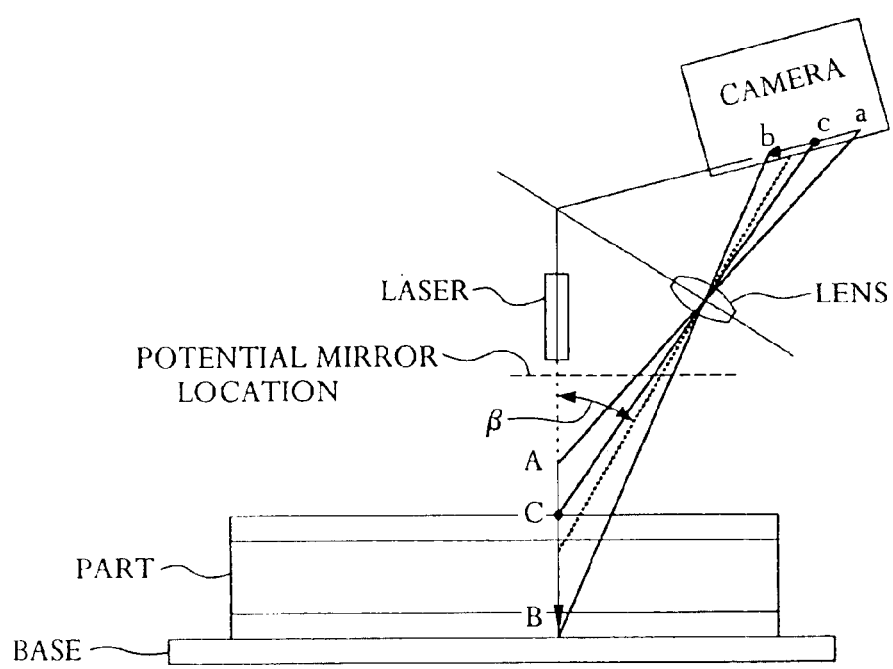
FIG. 4 is a front view of the non-contact profile measurement system shown in FIG. 3, in accordance with a preferred embodiment of the present invention.

As shown in FIGS. 3 and 4, when a laser is directed at the part to be measured, a line describes its path through space. A lens is oriented with its optical axis at an angle (β) relative to path of the laser. The lens, which may comprise more than one element, focuses light scattered, diffracted, or reflected from the region onto a linear detector. The linear detector may be a linear photodiode array, a linear CCD array, or a linear analog position-sensitive detector (PSD). Preferably, the detector is a linear CCD array. Each point along the laser path will image to a unique location along the image plane of the lens. The linear detector is located at the image plane of the lens so that the camera's photo detector will detect points of light along the laser path. When the laser illuminates the surface of a part to be measured, a small bright spot of light will be created. The lens will image a portion of this light onto the detector, as shown in FIG. 4 for point C imaging to point c. Using similar triangles, it is possible to determine the height of the part off the base (C-B) by analyzing the distance c-b.

The detector employed in the scanning system of the present invention consists of a linear array of individual pixels located in substantially the same plane as the laser as shown in FIG. 3. Although it is possible to utilize an area detector, such a system is sensitive to spurious reflections and extra effort must be made to process the image and find the intended measurement spot. The use of a linear detector results in off-axis light from reflection anomalies (such a scattered, diffracted, reflected, or multiply-reflected light other than from the desired scan region) substantially missing detection. In this configuration, the linear detector can only see directly down the line of the laser and is not affected by reflection anomalies off highly reflected parts. The detector of the present invention therefore detects substantially only scattered, diffracted, or reflected light from the desired scan region. It is also possible to use a single row of pixels from an area detector, but this is simply a slow and expensive way of implementing a linear array detector. The linear detector, or linear photo-detector, preferably comprises 256–4,096 light-sensitive pixels. More preferably, the detector comprises 2,048 pixels. The pixels may also be square in shape. It is important to carefully orient the linear detector array to lie in the same plane as the laser so that the image of points illuminated by the laser fall onto the detector and do not fall off the edge of the sensing area of the detector. The height of the pixels (the dimension perpendicular to the long axis of the array) acts as a field stop for the imaging system and determines the degree of rejection of spurious reflections. The smaller the height of the pixels, the better the spurious light rejection but the less forgiving the system is to co-planar misalignments of the detector and the laser.

As indicated in the side view of the optical system depicted in FIG. 3, it is also preferable to align the optical axis of the lens to lie in the same plane as the long axis of the detector and the axis of the laser propagation. This helps minimize aberrations in the spot images formed on the detector, which in turn provides for a higher maximum resolution obtainable from the scanner.

There are also several other important design issues that affect image aberrations in the scanning system. The side view of the system in FIG. 4 depicts a system arranged according to the Scheimpflug condition where the optical axis of the lens points towards the vicinity of the center of field of view of the detector. The transverse magnification of the system (m) is defined as:

$$m = \frac{h_i}{h_o}$$

where $h_o$ is the perpendicular distance from the illuminated point on the surface of the part to the optical axis of the lens and $h_i$ is the corresponding distance for the location of the image point. The tranverse magnification can also be found using:

$$m = \frac{f}{(s_o + f)}$$

where $f$ is the focal length of the lens and $s_o$ is the distance from the illuminated point on the surface of the part to the plane of the lens. The equation for finding the distance from the plane of the lens to the image point ($s_i$) is:

$$\frac{1}{s_i} = \frac{1}{f} - \frac{1}{s_o}.$$

According to both these relationships, the location of the image point is a non-linear function of the distance of the object point from the lens. The result is that the loci of the image of points along the laser line do not land along a line but instead land along a curve. The optical axis of the lens should ideally point at the center of the intended depth of field of the laser line. The non-linear magnification will cause the center of the field of view not to be imaged onto the center of the detector.

The angle subtended between the optical axis of the lens and the laser line also directly affects the non-linearity of the imaging. Below 20°, the non-linearity is very pronounced and hard to compensate for. At higher angles, the size of the scanner starts to grow and eventually becomes unwieldy.

Care must be taken to position the plane of the detector array so that it intersects the curved image in a fashion that minimizes aberrations. This positioning can be done manually or an optimal position can be pre-determined using a ray-trace program. It is also possible to utilize a field-flattening lens to control the curvature of the image and thereby minimize the aberrations.

The optical design (e.g. lens choice) is very important in minimizing imaging aberrations for both a large depth of field and for points that are well off axis (e.g. large field angle) while providing the proper magnification to fit the entire depth of field onto the detector array. The larger the aperture of the lenses, the more light gathered and the shorter the exposure time that can be utilized. However, the larger the aperture of the lens, the larger the aberrations and more degraded the performance of the system. Optimization is again best done with a ray-tracing program.

When properly focused, the laser will create a small spot of light where it intercepts the surface of the part in test. This spot will be imaged through the lens and onto the detector array. The pixel location of this spot can be found by analyzing the intensity profile from the detector array. If reduced resolution is allowed in the application, then only the pixel with the maximum intensity needs to be determined. To enhance resolution, some form of analysis must be conducted to determine the centroid location of the spot with sub-pixel resolution. Ideally, the image of the laser spot will have a symmetrical intensity profile such as a Gaussian profile and the "location" of the spot can be easily defined by utilizing a curve fitting technique to determine the maximum of the intensity distribution. Aberrations will degrade the symmetry of the intensity profile and make a unique determination of the spot location more difficult. The measurement resolution is a function of the number of pixels versus the depth of the field. It is also affected by the width of the laser beam as it strikes the part, the quality of focus provided by the optics, the visibility of speckling in the image of the laser spot and the exposure time of each measured point. Additionally, if the angle between the laser and the camera is too acute, the nonlinear magnification across the depth of field starts degrading the resolution of points in the far field.

Another form of image degradation that can degrade the precision of the spot location determination is caused by over exposing the detector, causing saturation of the image. When the laser is grazing a highly reflective part, most of the light is specularly reflected away from the detector and the measurable back-scattered intensity is small. However, when a highly reflective part is nearly normal to the laser, the measured intensity can blind the detector. The result is an intensity distribution with a flat top. If the flat top is wide enough, unique determination of the spot location can be very difficult. One method of controlling over-exposure is to dynamically change the exposure time of the detector. Another method is to dynamically control the intensity of the laser.

There are several potential methods of monitoring the over-exposure condition. It is possible to analyze the previous exposure and attempt to predict an appropriate exposure time or laser intensity. This method will help improve overexposure conditions for future measurements but cannot react to quickly changing object conditions and will therefore result in some degree of over exposure. A novel approach which may be utilized in the present invention is to include a secondary optical system that monitors the real-time intensity of the image spot and immediately adjusts the exposure time or laser intensity accordingly. The secondary optical system will have an almost identical optical configuration as that of the line detector. One implementation of a secondary optical path automatic gain control (AGC) system is the redundant Scheimpflug system shown in FIG. 5. A single photo-detector (referred hereinbelow as the AGC detector) is used to monitor the magnitude of the light scattered, diffracted, or reflected off the part being measured from the desired scan region. The AGC detector is long enough to simultaneously capture light from the whole depth of field and has a slit aperture so it matches the spurious light rejection characteristics of the linear array detector. The AGC detector sees the exact same spot as the linear array detector. The AGC detector is located substantially adjacent to the linear detector with a smaller base angle but still focused with the Scheimpflug condition in a common plane with the rest of the optics. The AGC detector monitors the magnitude of the intensity of the light scattered, diffracted, or reflected from the external surface of the part from the desired scan region. In this fashion, the AGC detector (which is preferably a long aspect ratio photo-detector) receives/detects an amount of optical flux that is substantially proportional to that received by the line detector. The magnitude of the light intensity monitored by the AGC detector is used to control the output laser power to the proper level for the linear detector or to control the exposure time. The gain adjustment is continuous with only a very slight latency. The gain is stabilized during the actual camera exposure period. Thus, once the response of the AGC detector is calibrated to match the response of the linear array detector, the AGC system can be used to control the laser intensity or exposure time and thereby avoid saturating the exposure of the linear array detector. The secondary optical system includes a beam splitter preferably located in the scattered, diffracted, or reflected light path subsequent the lens. In this configuration, light detected at the AGC detector travels off the beam splitter. Alternatively, instead of using a beam splitter, the light detected at the AGC detector may travel through a secondary lens (FIG. 6) located substantially adjacent to the main lens.

Figure 5:
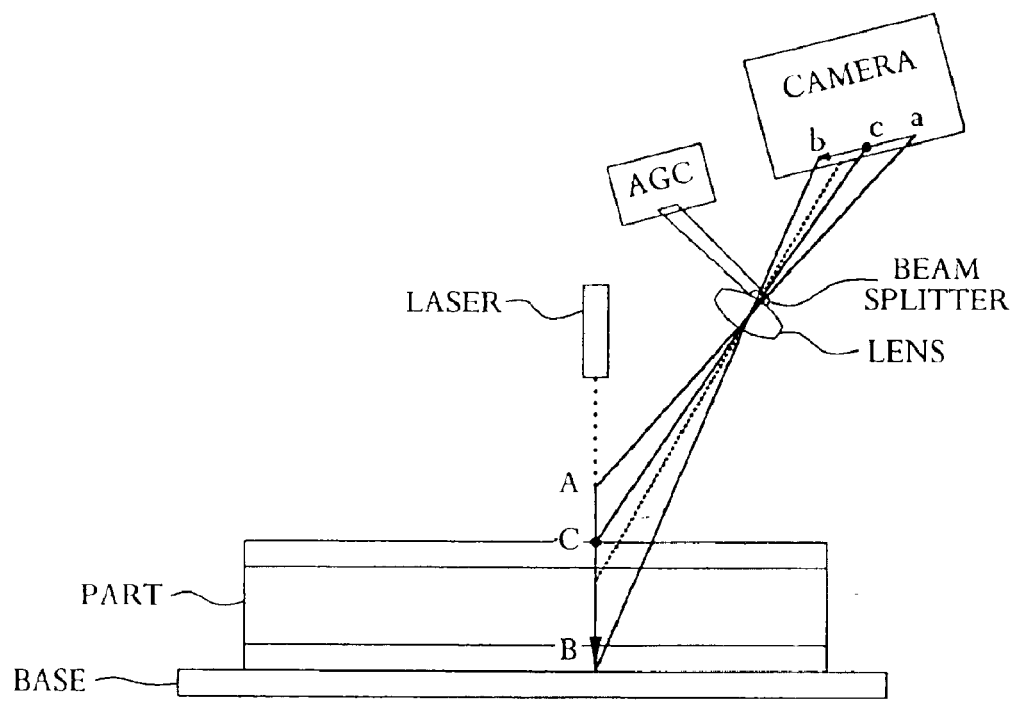
FIG. 5 is a front view of a non-contact profile measurement system that utilizes an automatic gain control (AGC) system which includes the use of a beam splitter, in accordance with a preferred embodiment of the present invention.
Figure 6:
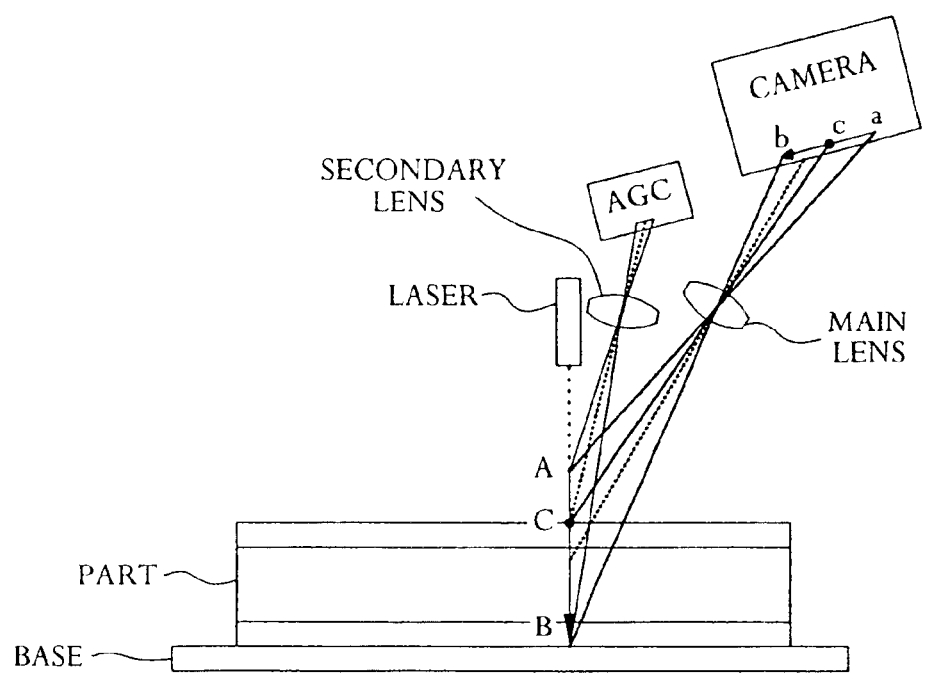
FIG. 6 is a front view of a non-contact profile measurement system that utilizes an AGC system which includes the use of an ancillary lens, in accordance with a preferred embodiment of the present invention.

The scanning configurations shown in FIGS. 4–6 are capable of measuring the location of a single point on the surface of a part relative to a fixed reference point. To measure the cross-sectional surface geometry of the part, it is necessary to sweep the measurement spot across the part. Two ways to accomplish this are by moving the part with a fixed scanner or by moving the scanner with a fixed part. One method of moving the scanner would be to rotate the scanner around a fixed axis. For instance, the entire scanner could be pivoted around an axis that is normal to the view in FIG. 2 and goes through the depicted lens, allowing a partial cross-section of the part to be scanned and measured.

Figure 7:
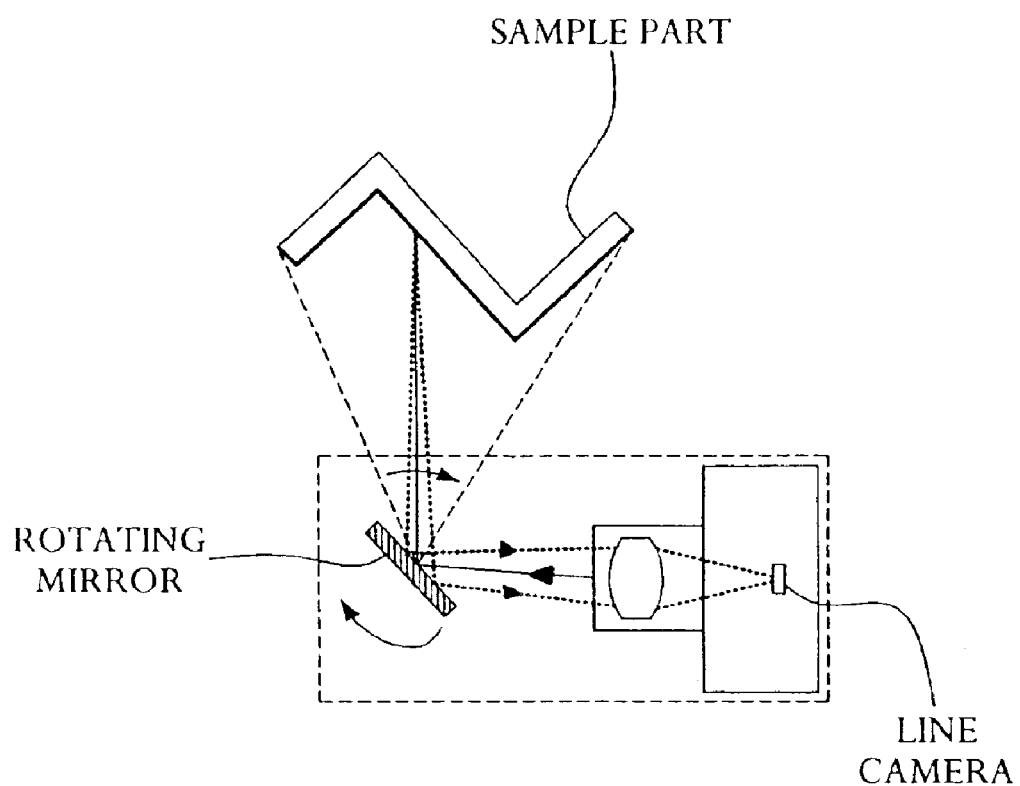
FIG. 7 is a simplified illustration of a non-contact profile measurement system utilizing a rotatable mirror, in accordance with a preferred embodiment of the present invention.

An even faster method of measuring multiple surface points is to utilize a mirror to fold the entire optical path. FIG. 4 indicates one possible location where a mirror could be inserted into the optical path to convert the system in FIG. 3. As long as the mirror affects both the outgoing laser beam and the returning signal light, cross-sectional scanning can be accomplished by rotating the mirror instead of the entire scanner body. Referring to FIG. 7, the mirror can be a single long mirror or comprised of a small facet (not shown) to sweep the laser and a longer section (also not shown) to intersect light from points along the entire field of view. Both faceted mirrors are preferably provided on a common rotary shaft thereby avoiding any potential synchronization problems (i.e. the common shaft keeps the location of the laser and the field of view of the camera automatically synchronized). The width of the field of view is a function of the number of facets on the polygon mirror(s). The rate at which pixels are clocked out of the linear detector, the target point measurement density, the depth of field, and the standoff will together determine the rotation rate of the polygon scan mirror. The polygon mirror rotation rate determines the time for measuring a cross-section.

Figure 8:
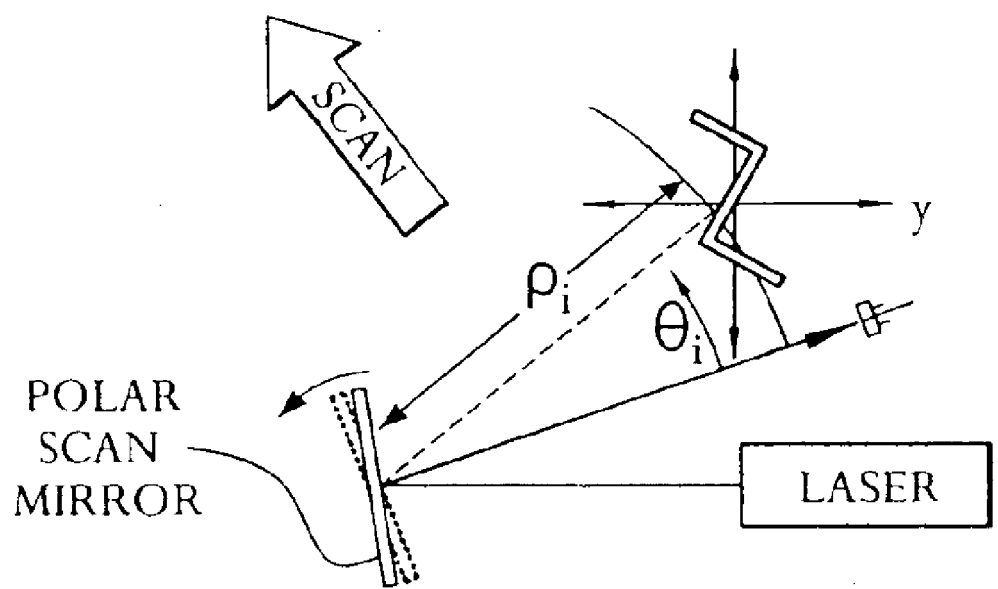
FIG. 8 is a simplified illustration of the rotatable mirror shown in FIG. 7 performing a polar scan, in accordance with a preferred embodiment of the present invention.

FIG. 8 illustrates that the scanner is essentially a polar scanner that measures points along the part surface in terms of angle ($\theta$) and radial distance ($\rho$) from some reference location inside the scanner. The physical size of the linear array and the magnification of the optical imaging system affect the depth of field of view in the radial direction. The number of pixels, the quality of the spot images and the signal analysis routine affect the resolution of measurements in the radial direction ($\sigma_\rho$). The width of the field of view of the scanner is affected by physical obscurations in the sweep path such as the Scanner Case and the mirror geometry. For instance, since the optical sweep off a mirror ($\Delta\theta_{opt}$) is related to the mechanical sweep ($\Delta\theta_{mech}$) by $$\Delta\theta_{opt} = 2\Delta\theta_{mech},$$

a single flat mirror could physically intersect the laser for a full sweep of 180°, resulting in an optical sweep of near 360°, although the practical sweep is less due to the cosine projection of the mirror becoming so small near grazing incidences. However, a 4-sided polygon mirror geometry would have $\theta_{mech}=90°$ and $\theta_{opt}=180°$ and a 6-sided polygon mirror geometry would have $\theta_{mech}=60°$ and $\theta_{opt}=120°$, both of which could be utilized in a practical manner in accordance with the present invention. The precision of which either $\theta_{mech}$ or $\theta_{opt}$ is determined will affect the resolution of measurements in the angular direction ($\sigma_\theta$).

The single flat mirror is used to sweep the laser past the surface of a freshly machined aluminum part with a highly reflective surface. A standard frame grabber (part of the scanner's embedded electronics) is utilized to acquire the intensity profile from the linear array for each exposure taken at a different angle, resulting in a plot of image intensity at $\rho,\theta$ positions. A row by row analysis of the composite image is conducted using a CPU (also part of the embedded electronics) to find the radial location of the brightest pixel for each angular position. This set of surface locations can then be analyzed with a calibration routine to project the points that represent the surface of the part into Cartesian coordinates.

Figure 9:
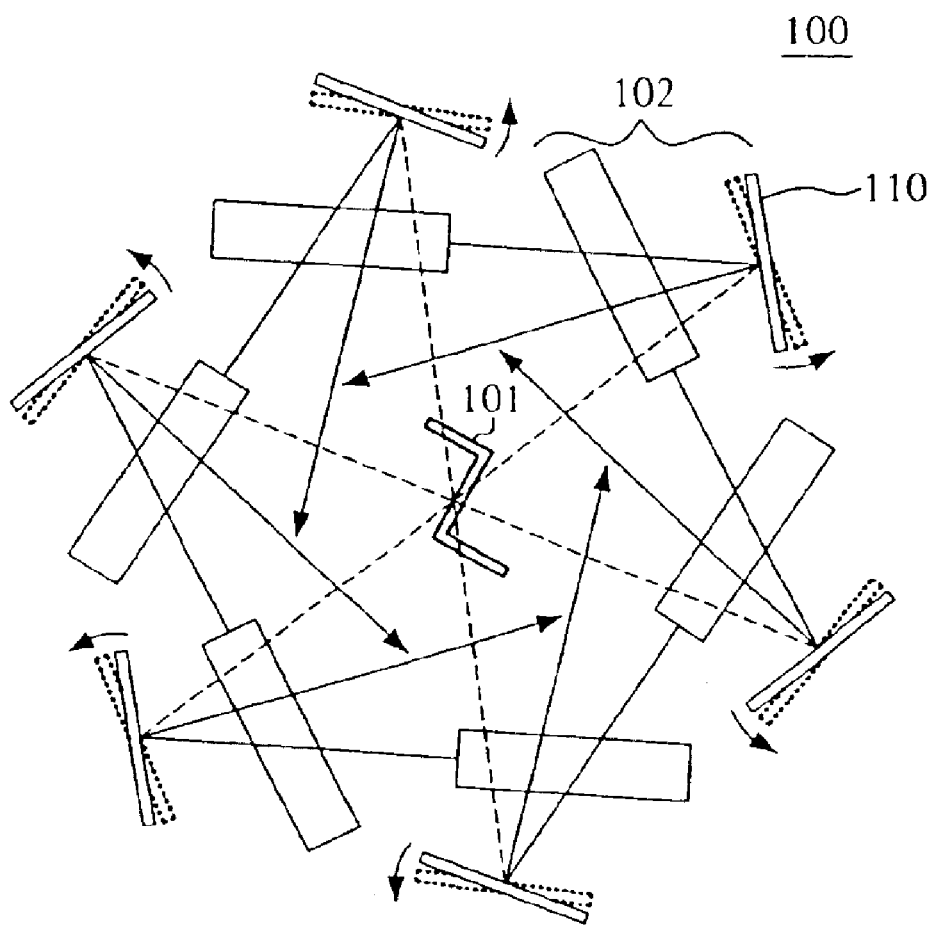
FIG. 9 is a side view of a composite system utilizing six non-contact profile measurement systems, in accordance with a preferred embodiment of the present invention.

This example shows how using multiple scanners or repositioning the part relative to the single scanner allows a complete external cross-sectional profile of the part to be measured. FIG. 9 shows a composite system 100 which provides 6 different scans which were simultaneously obtained at 60° increments around the part 101 using 6 non-contact profile measurement systems 102 including 6 long non-faceted mirrors 110. Any number of scan systems may be utilized (e.g. 3, 4, 5, 6, 7, 8, 9, 10, etc . . . scan systems) with 6 being the preferred number. Some degree of overlapping of each scanning system's field of view is suggested to thereby provide a complete scan. The complete composite cross-sectional scan of the part surface is extremely precise and has no irregularities caused by the highly reflective nature of the part. This accurate and clean data can be compared to an aberration-containing exposure which inevitably would be obtained using the prior art system shown in FIG. 1. The data created by individual scan systems or by repositioning the part relative to a single scanner can be projected or reported in a common coordinate system to provide a integrated profile of either portions or all of the components surface. Further, if the component is moved relative to the multiple scanner system, then data representing cross-sectional profiles at different longitudinal (i.e. X-axis) positions can be collected. This data, combined with data representing Y-axis and Z-axis measurements taken by the scan systems, allows either portions or all of the three-dimensional external surface profile of the component to be collected.

The system of the present invention as described above, when properly calibrated, is capable of determining spatial locations of surface features to an accuracy of 0.003 inches while providing an extremely fast scanning of, for example, a 100 foot-long part in less than 30 minutes. The detector allows for more than 7,000 images to be acquired per second, i.e. the images based on linear array exposures.

Figure 10:
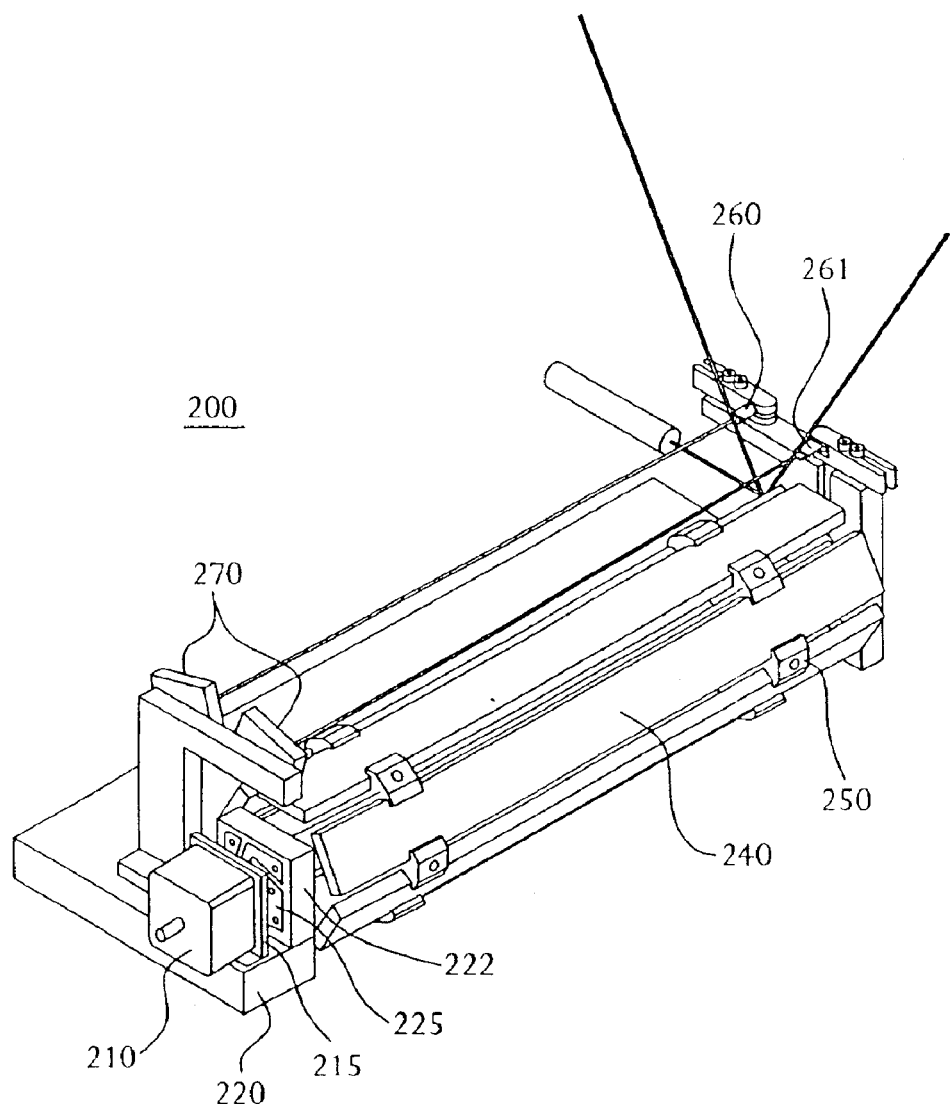
FIG. 10 is a perspective view of a non-contact profile measurement system utilizing a rotatable polygon mirror system, in accordance with a preferred embodiment of the present invention.
Figure 11:
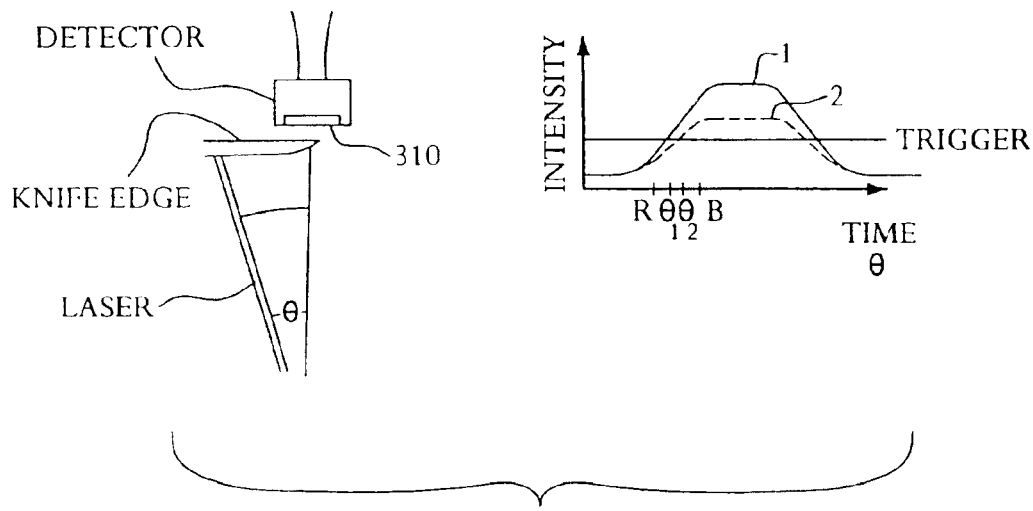
FIG. 11 is a simplified illustration of a prior art positional trigger comprising a knife edge aperture and a photo detector and a corresponding plot.

As an alternative to the rotating mirror of the type depicted in FIG. 7, a rotating polygon mirror 210 as described below in conjunction with FIG. 10 may instead be used. The rotating polygon scan mirror system 200 depicted in FIG. 10 comprises a plurality of mirror facets, e.g. 6 or more. The mirror system 200 also comprises a rotating rotor shaft having the plurality of mirror facets positioned substantially concentrically surrounding the rotor shaft. The diameter of the rotor shaft is preferably in the vicinity of 75 mm and the individual mirror facets are preferably in excess of 300 mm in length. A motor, e.g. of stepper type, is used to drive the rotor shaft. The use of a stepper motor allows for a low cost motor to be utilized along with a simple drive circuit, while still maintaining precise control over the rotation of the shaft. Preferably, a motor capable of 200 steps per revolution is used to allow use of low torque impulses and to place impulses from the motor at a frequency much higher than the desired 1 to 2 Hz rotational frequency of the rotor. The motor body is not directly coupled to the rotor mounts but is affixed to a motor bracket 215 affixed to a common base 220. The shaft down the center of the rotor has precision bearings that are affixed to either end. The shaft is supported by the bearings that in turn are coupled to mounting brackets 222 by self-centering, spring-loaded conical supports 225 that engage the inner race of the bearings. The motor bracket 215 has a hole through it to allow the motor shaft to extend therethrough. Preferably, the motor shaft is not directly affixed to the rotor shaft but is instead coupled to a long, tightly wound and slightly expanding, helical torsional spring housed inside the rotor shaft that is in turn coupled to the rotor shaft. The spring is carefully chosen so as to act as a mechanical low pass filter. The high frequency impulses from the stepping of the motor are absorbed by compression of the spring but the low frequency drive power is efficiently and effectively coupled to the rotor shaft. The spring prevents the high frequency impulses from the stepping of the motor from affecting the rotation of the rotor shaft. The spring also reduces the likelihood that vibrations from external sources will affect the rotor shaft rotation. This isolation from high frequency events eases the requirements of the control circuits and algorithms and is therefore fundamental to yielding a smooth and controlled rate of rotation.

The amplitude response of a torsional spring drops off at approximately −20 dB/decade from its resonance frequency ($f_o$). The resonance frequency is given as $$f_o = \frac{1}{2\pi}\sqrt{\frac{\kappa}{I}}$$

where $\kappa$ is the torsion constant of the spring and $I$ is the moment of inertia of the rotor system. In this embodiment, the intended rotation rate is between 1 Hz and 2 Hz, yielding laser sweeps at 6 Hz to 12 Hz, stepper impulses at 200 Hz to 400 Hz and the sampling rate of individual optical profile points at greater than 7 kHz. The value $f_o$ is preferably chosen to be 0.1 Hz, which is below all of the critical frequencies in the system. Therefore, the amplitude of the rotor reaction to the individual stepper impulses at 200 Hz is reduced by $10^4$ compared to the amplitude reaction to the intended rotation rate of 1 Hz. Although this system will be prone to periodic velocity variations occurring at the resonant frequency $f_o$, a well-tuned control circuit can help minimize the magnitude of the variations. In this embodiment, each laser sweep occupies less than $\frac{1}{60}^{th}$ of a period of the velocity variation. It is therefore possible to effectively approximate the acceleration during each sweep period as constant and thereby compensate for velocity variations without the need for profiling changes in acceleration that occur during each sweep. It is noted that the spring may not be necessarily restricted to being housed within the rotor shaft but, for example, may alternatively be concentrically positioned surrounding the rotor shaft.

The polygon mirror system may be comprised of any number of mirrors but preferably comprises 6 mirrors. In the 6 mirror configuration, 6 first-surface glass mirrors 240 which are each ⅛ inch thick are used to achieve rigidity, dimensional stability, high reflectance and low cost. The mirrors are arranged at 60° intervals around the shaft and are self-supported except where they engage a pair of standoffs that are in turn affixed to the shaft. The standoffs are in the form of disks with 6 flats around the perimeter to locate the mirrors and are machined to have small metal tangs 250 that extend up to thereby form a common plane. In this orientation, the small metal tangs contact portions of the outside mirror surface of each mirror to help constrain the location of the reflecting surface. Centrifugal force from the rotation of the rotor shaft, supplemented with a small spring, forces the outside mirror reflecting surface of the mirrors to engage onto the pre-aligned plane determined by the small metal tangs. The mirrors are not over-constrained so that the glass can expand due to effects from thermal variations while the reflecting plane is kept registered against the reference plane created by the small metal tangs. This design also has the advantage of placing most of the mass in a shell around the outermost periphery of the rotor shaft. This placement maximizes the moment of inertia of the rotor shaft assembly and, as a result, helps provide for maximum stability of the rotational velocity.

This method of assembling the polygon mirror system from individual parts yields mirror assemblies that are not initially perfectly balanced around the longitudinal axis of the shaft, potentially resulting in vibrations during rotation. To overcome this problem, small tapped holes and small set-screws are included in the mirror standoff disks. Using a static balance fixture that allows the mirror system to rotate freely under the influence of gravity, small set-screws are placed into the small tapped holes on the high side of the rotor shaft which yield perfect balance in static conditions. This balancing drastically reduces vibration of the mirror system during rotation and therefore improves errors in velocity control.

The scanner system utilizing the polygon mirror system described above sweeps the measurement beam through a range of angles and acquires images at regular intervals. Uniformity of mirror rotation with respect to time is critical to achieving accurately spaced sample points on the test object. The accuracy with which the scanning system can determine the angular position of a particular surface location is related to how accurately the sweep angle of the measurement beam can be determined at the instant the measurement exposure is taken. In this system, the angular accuracy and resolution is a result of utilizing a high-speed clock in conjunction with of a series of precision triggering devices to generate a highly accurate time basis for determining the physical positions or critical events.

In one embodiment, a small metal tang is located on one of the standoff disks. The tang acts as a flag that on each rotation triggers a stationary optical interrupt switch attached to the base. This trigger pulse ("home") is utilized by the circuitry and software for a unique determination of when the mirror designated as #1 is in position to reflect the outgoing illumination beam. The motor driving circuitry that stabilizes the rotation rate of the rotor shaft also uses this trigger pulse for first order angular velocity control.

The measurement laser reflects off the mirrors and is swept through an angle of almost 120°. In one embodiment, measurement is required over the central 55° of the sweep. To implement start-of-scan (SOS) trigger pulses, a small turning mirror 260 on a bracket on the rotor mount intercepts the beam in the vicinity of −30° from top dead center and directs it to a set of reference photo-detectors 270 preferably mounted on the rotor mount on the other end of the rotor. The second trigger detector illuminated in the SOS set ("tick") is aligned to trigger at precisely −30° and indicate the precise start of scan. A second small turning mirror 261 is fixed to the rotor mount that picks off the beam in the vicinity of +30° and directs the beam to a set of end-of-scan (EOS) reference photo-detectors where the first detector illuminated ("tock") is aligned to trigger at precisely +30°. In other words, the small turning mirrors 260, 261 are used to sample the outgoing scan beam near the beginning and the end of the measurement beam sweep which may be on the order of approximately 120° for each mirror facet. The sampled light is therefore re-directed to sweep across the set of SOS and EOS positional triggers oriented to allow a 60° scan between them. The mirrors and photo-detectors serve as fixed angular references that can be used to track the rotational velocity of the rotor, independent of the mirror placement around the shaft. The control circuit uses a high-speed clock to measure the elapsed time for the laser to sweep the angle between tick and tock. This parameter can be used as feedback to precisely control the speed of the rotor rotation so it achieves the desired rotation rate.

Figure 12:
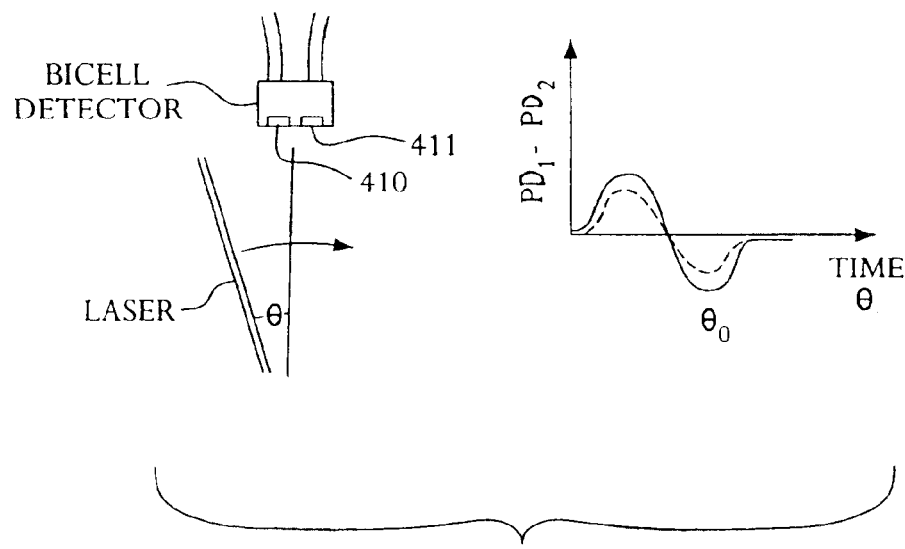
FIG. 12 is a simplified illustration of a positional trigger comprising a bi-cell photo-detector and a corresponding plot in accordance with a preferred embodiment of the present invention.

The positional reference photo-detectors are constructed from photo-diode bi-cells, where two photodiodes are immediately adjacent to each other with minimal non-detecting dead space between them. The outputs of the two detectors are run through transimpedance amplifiers to convert the photocurrent to voltage. The difference of the voltage signals is created by attaching the first photodiode to the non-inverting input of a standard amplifier and the second photodiode to the inverting input. As shown in FIG. 12, the measurement beam sweeping across the bi-cell detector initially illuminates the first photo-diode 410, generating a rising photocurrent as the beam sweeps fully onto the detector. Note that the bi-cell detector shown in FIG. 12 may be either the SOS or EOS detector. As the beam sweeps off the first detector and onto the second photo-diode 411, there is an instant where the intensity on the two photo-diodes 410, 411 is balanced and the voltage difference crosses zero $\theta_0$ (i.e. when the measurement beam has equal intensity on both photo-diodes 410, 411). The circuitry generates a trigger pulse upon the occurrence of this zero crossing event, resulting in a highly deterministic measure of the time when the beam was centered at the exact position of the space between the photodiodes. The difference signal then goes negative as the beam sweeps across the second photo-diode 411. The zero crossing of the difference signal can be used as a highly deterministic trigger point that does not suffer from temporal or positional jitter due to variations in the intensity of the measurement beam and variations in laser beam width. Note that any physical realization of trigger circuitry is subject to a small amount of time jitter that will affect positional accuracy. Therefore, the longer the beam path from the rotor to the positional reference detectors, the smaller the angle that the jitter represents and the greater the precision of the angle reference trigger pulses.

Bi-cell triggers can be used in conjunction with a high-speed clock to accurately determine the angular position of a particular sample of the measurement beam. Since the rotor has N precisely oriented mirrors, each mirror can generate a $2\pi/N$ mechanical sweep, corresponding to a $\pi/N$ optical deflection of the beam. Therefore, $\pi/N$ divided by the time elapsed from one SOS to the next SOS constitutes the optical angular velocity. If the time from SOS to the sample is multiplied by the optical angular velocity rate, the result is the subtended angle from the SOS position to sample position. By employing the elapsed time from SOS to a well characterized EOS sensor position, a highly accurate determination of the angular position can be determined that is independent of mirror to mirror variations. Further, the time elapsed between SOS and EOS provides an accurate angular velocity measurement to the velocity control circuit that is also independent of mirror to mirror variations. Any number of positional triggers can be used to characterize the velocity and acceleration profile of the measurement beam and thereby improve the accuracy of the angular measurements taken by the scanner system. Thus, the deficiencies mentioned above in the Background of the Invention section with respect to the rising edge trigger technique are overcome with this intensity-independent method of precise positional triggering.

The tick detector is used to precisely determine the beginning of scan sweep. This pulse is used to reset a high-speed elapsed time clock counter and to trigger subsequent acquisition of measurement exposures. The elapsed time from tick to the instant of each measurement exposure ($t_n$) is logged with the data for each exposure. The counter value when the trigger pulse from the tock detector arrives ($t_{tock}$) precisely determines the elapsed time for the measurement beam to cross the entire scan region. Fundamental rate equations provide that the scan angle for the $n^{th}$ exposure ($\theta_n$) can be determined by $$\theta_n = \theta_0 + \omega t_n$$

where $\omega$ is the rotational velocity and $\theta_0$ is the initial angular offset at tick.

Figure 13:
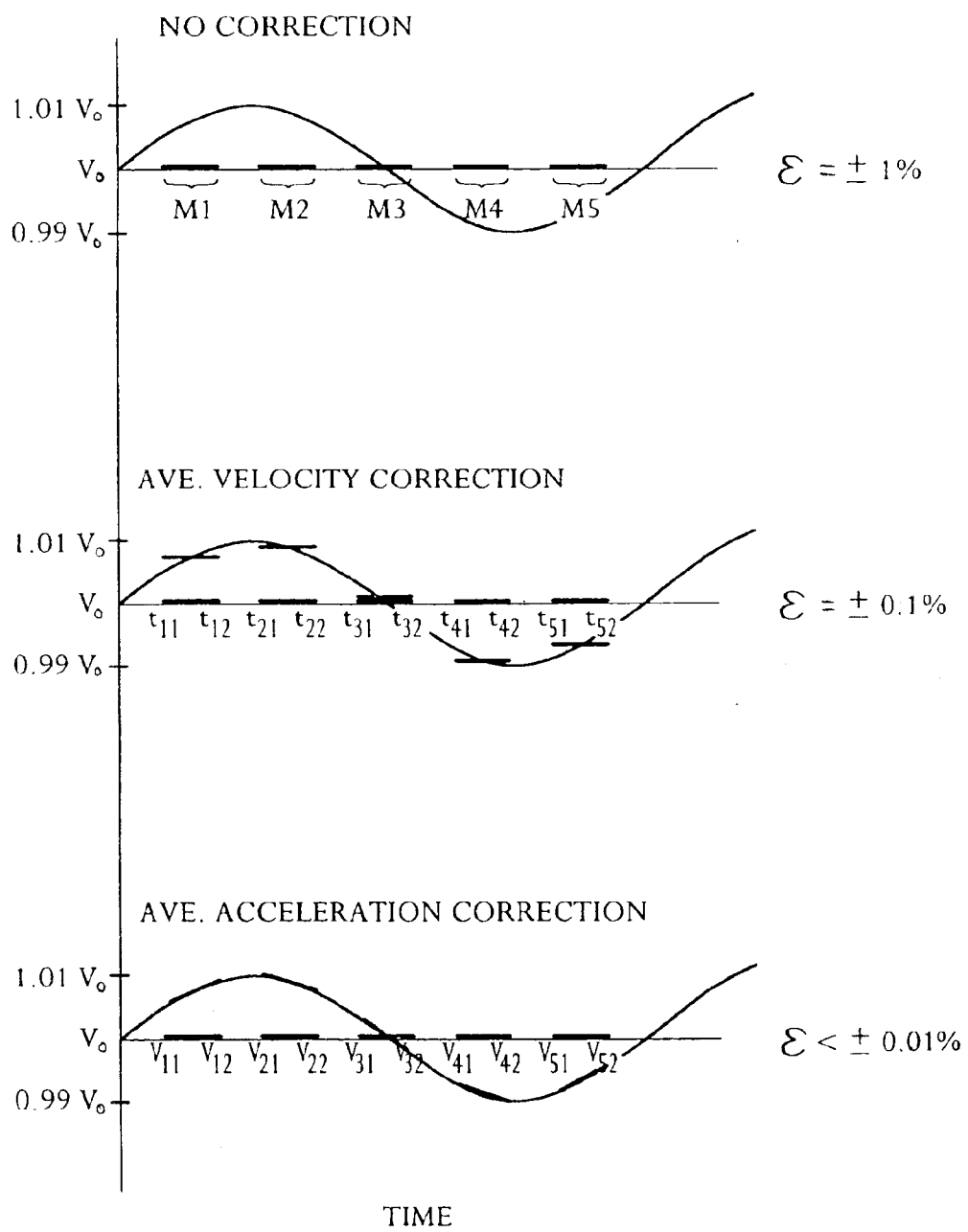
FIG. 13 illustrates three plots which exemplify various aspects of compensation for motor velocity variation using the signals from SOS and EOS positional triggers.

Since the rotor is subject to periodic velocity variations at the resonant frequency of the torsional spring, the time-based technique of using an SOS and EOS trigger accounts and corrects for small variations in the rotational speed in the so called "rubber banding" process. The three plots in FIG. 13 show the implications of implementing rubber banding algorithms. The top plot shows a periodic velocity variation of +/-1% around a nominal value of $v_0$. The section where mirrors are sweeping and acquiring data are labeled as "M1", "M2" and so forth. If, as in the top plot in FIG. 13, the value of $\omega$ is assumed to be stable at $v_0$, then the determined value of $\theta_n$ can be off as much as 1%. However, the average value of $\omega$ during the sweep can be determined using $$\omega = \frac{\theta_{(tock-tick)}}{t_{tock} - t_{tick}}$$

where $\theta_{(tick-tock)}$ is the fixed angle subtended by tick and tock, $t_{tick}$ is the timer value at tick, and $t_{tock}$ is the timer value at tock. As shown in the middle plot in FIG. 13, compensation for the average velocity between tick and tock leads to errors in the determination of $\theta_n$ an order of magnitude smaller than in the top plot. An even more accurate determination of angular position can be obtained by accounting for the angular acceleration of the rotor ($\alpha$) using $$\theta_n = \theta_0 + \omega t_n + 0.5\alpha t_n^2$$

The bottom plot in FIG. 13 shows where the average value of the angular acceleration of the rotor is used to reduce positional measurement errors by more than two orders of magnitude. The average value of $\alpha$ can be found using $$\alpha = \frac{\omega_{tock} - \omega_{tick}}{t_{tock} - t_{tick}}$$

where $\omega_{tick}$ and $\omega_{tock}$ are the angular velocities when the beam crosses tick and tock, respectively. One implementation for determining a value for cc is to replace each singular bi-cell trigger used for tick and tock with a set (or pair) of bi-cell triggers separated by a known distance. The initial angular velocity of the rotor sweep can be determined by $$\omega_{tick} = \frac{\theta_{(tick2-tick1)}}{t_{tick2} - t_{tick1}}$$

where $\theta_{(tick2-tick1)}$ is the fixed angle subtended between the first tick detector (tick1) and the second tick detector (tick2) and the values for $t_{tick1}$ and $t_{tick2}$ are the timer values when the beam crosses their respective detectors. The final angular velocity can be determined in the same manner by substituting tock for tick in the previous equation.

In the situation where rotation velocity variations occur at 0.1 Hz and the measurement sweeps occur near 12 Hz, the acceleration during each sweep can be considered constant and the average angular acceleration suffices to determine the angular position of the measurement beam. In a situation where variations occur in such a fashion that the acceleration cannot be approximated as constant during a sweep, rubber banding velocity compensation can be accomplished if velocity measurements are taken at multiple intervals during the sweep. One method of acquiring constant trigger pulses from the measurement beam while still conducting optical profilometry is to replace the small turning mirrors with partial mirrors know as beam splitters. This allows for a small portion the measurement beam to be monitored for position while the majority of the power in the beam is simultaneously used for optical scanning. It is then possible to utilize as many optical triggers to span the sweep of the beam as are needed to allow sufficient correction for variations in the angular velocity.

Although the home position sensor in conjunction with the optical reference detectors provide a method for velocity control and compensation, they do not address the needs of eye safety. In order to comply with eye safety requirements, a fail-safe method must be implemented that reduces the beams output power until the rotor has reached a safe rotational speed and turns it off it in the event that the rotor stalls. This requires that there be a hardware system independent of the measurement beam that can establish velocity, monitor for stall conditions and react quickly enough to prevent eye damage for the worst case where the rotors stalls, i.e. when the measurement beam is directly viewed. For a 20 mWatt laser, the scanning system is considered Class II eye safe only as long as the rotor is turning at a rate of rotation greater than 60 RPM. A hardware interlock system and method must be included in the scanner system to disable or dim the laser until the rotor is up to speed and to disable or dim it within 0.1 seconds in the event that a complete rotor stall occurs.

Figure 14:
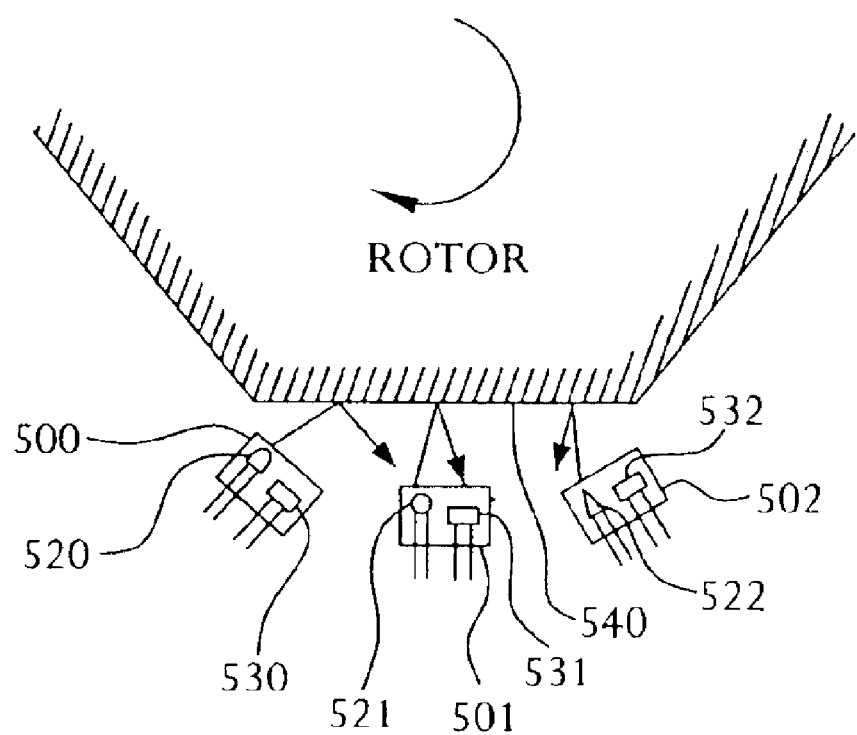
FIG. 14 is a simplified illustration of mirror facets of the polygon mirror system in conjunction with a series of reflective object sensors to implement a low-cost optical encoder configuration suitable for rough velocity control and fail-safe eye safety control of the laser.

One implementation that addresses this issue is a series of reflective object sensors 500, 501, 502 (shown in FIG. 14) used in conjunction with a power control circuit of the laser. The independent system produces a pulse stream as the rotor revolves and automatically shuts off or dims the laser if a pulse is missing or pulses occur too far apart in time. A reflective object sensor is a commercially available device comprising, for example, an LED light source 520, 521, 522 adjacent a photo-detector 530, 531, 532. When directed at a mirror 540, the device produces an appreciable (and detectable, i.e. by the particular object sensor's photo-detector) output signal only when the axis of the device is substantially normal to the mirror surface 540. If the axis of the device is directed at the center of rotation of the rotor shaft (as depicted in FIG. 14), then each device will produce a pulse as each mirror rotates past when the device axis is substantially normal to each mirror surface. For 6 mirror facets, a single device will produce a pulse train at a frequency 6× the rotational frequency. Three devices can be utilized to produce a constant pulse train frequency at 18× the rotational frequency by orienting the three devices at preferably 20° intervals around the rotor (i.e. all three devices positioned substantially adjacent to one another such that the light output from each LED light source is capable of being reflected off of the same mirror surface simultaneously as depicted in FIG. 14) with their axes directed towards its center. A pulse train of more than 18× can alternatively be implemented. The number of mirrors (M) multiplied by the number of reflective object sensors (N) gives the number of pulses obtained per rotation. 360° divided by the quantity (M×N) gives the preferred interval to locate adjacent devices so as to obtain a constant pulse train.

Furthermore, it is to be understood that although the present invention has been described with reference to a preferred embodiment, various modifications, known to those skilled in the art, may be made to the structures and process steps presented herein without departing from the spirit and scope of the invention as set forth in the several claims appended hereto. Although the figures depict a laser source used to illuminate the part being measured, in practice, any source of illumination that provides a bright spot on the surface of the part could be utilized. A source of light that emits light of substantially collimated type is preferable. This includes but is not limited to a gas laser, a diode laser, a light emitting diode, the output of a lamp, or the output of an optical fiber. Regardless of the source, the illumination source must be focused so as to have minimal cross-sectional spot size of the beam in the measurement region and thereby illuminate as small a spot on the part as possible. The size of the measurement spot is correlated to the smallest feature that can be measured and therefore the resolution of the scanner. The spot size on the part is related to the minimum spot size obtainable in a diffraction limited optical system (B) given as $$B = 2.44 * \lambda * \frac{f}{D}$$

where $\lambda$ is the wavelength of the illumination, $f$ is the focal length of the lens and D is the diameter of the beam at the lens. The larger the diameter of the beam, the smaller the spot at focus but the larger the divergence of the beam, limiting the depth of field where the illumination spot is small enough for high resolution scanning. Therefore, care must be taken in designing the illumination system to balance the minimum spot size and the beam divergence so as to keep the spot sufficiently small across the entire depth of the scan volume.

FIG. 4 also shows the laser directed at an angle normal to the long axis of the part. This orientation is not a requirement and, in principle, a large range of orientations would result in an accurate and efficient scanning system which functions similarly in accordance with the scope of the present invention.

Although FIG. 9 shows the plurality of profilometry systems arranged substantially equidistant from one another in a substantially circular configuration around the component, any configuration shape can be envisioned (e.g. a rectangle) within the scope of the present invention. Moreover, in accordance with the teachings of the present invention, profilometry systems may alternatively be arranged in a non-equidistant relationship from one another so long as the distance-differing relationships are compensated for.

Further, although the designs illustrated in the figures depict use of rotatable mirror systems, other types of re-positionable mirror systems may be alternatively employed and may be considered to fall within the scope of the teachings of the present invention. For example, where the entire scanner assembly houses a plurality of stationary mirrors, the entire scanner assembly may rotate or pivot, thereby providing the necessary sweep scans.

What is claimed is:

1. A system for measuring the profile of an external surface of a component comprising:

a plurality of profilometry systems surrounding the component, each profilometry system comprising:
  a source of light that emits light destined to be incident onto a plurality of locations within a region of an external surface of a component;
  a linear, light-sensitive sensor;
  a lens used to image the plurality of locations within the region onto said linear, light-sensitive sensor; and
  a re-positionable mirror positioned in the light path between the region and said source of light, said lens, and said linear, light-sensitive sensor, wherein said re-positionable mirror re-directs the light emitted from said source of light to said plurality of locations within the region and re-directs light scattered, diffracted, or reflected from said plurality of locations within the region to said lens and said linear, light-sensitive sensor;
wherein said source of light and said linear, light-sensitive sensor are positioned substantially within the same plane such that said linear, light-sensitive sensor detects substantially only light scattered, diffracted, or reflected from the region and traveling substantially within said plane; and
wherein each profilometry system is calibrated in a common coordinate system to produce an integrated profile of the component.

* * * * *